United States Patent [19]
Lo et al.

[11] Patent Number: 5,598,418
[45] Date of Patent: Jan. 28, 1997

[54] REPEATER STATUS LED ARRAY INTERFACE

[75] Inventors: William Lo, Santa Clara; Stephen McRobert, Sunnyvale, both of Calif.

[73] Assignee: Advanced Micro Devices Inc., Sunnyvale, Calif.

[21] Appl. No.: 337,633

[22] Filed: Nov. 10, 1994

[51] Int. Cl.⁶ .................................................. H04J 3/14
[52] U.S. Cl. ...................... 370/501; 340/825.17; 345/46; 364/146; 364/188
[58] Field of Search ............................ 370/97, 13, 13.1, 370/14, 94.1, 94.3; 345/33, 46; 340/425.1, 825.17; 364/146, 188; 371/29.1

[56] References Cited

U.S. PATENT DOCUMENTS

| | | | |
|---|---|---|---|
| 3,976,995 | 8/1976 | Sebestyen | 340/825.44 |
| 4,037,199 | 7/1977 | Rozehnal et al. | 370/97 |
| 4,125,830 | 11/1978 | Cochran et al. | 345/46 |
| 4,203,011 | 5/1980 | Coviello | 379/165 |
| 4,308,615 | 12/1981 | Koegel et al. | 371/29.1 |
| 5,293,375 | 3/1994 | Moorwood et al. | 370/97 X |
| 5,361,265 | 11/1994 | Weinberger et al. | 371/29.1 |

FOREIGN PATENT DOCUMENTS 0495575  7/1992  European Pat. Off. .

OTHER PUBLICATIONS

National Semiconductor, Microcontroller Databook, pp. 1–115–1–138, 1989.
Patent Abstracts of Japan, vol. 14, No. 84 (P-1007), 16 Feb. 1990 & JP,A,01 295300 (Ricoh Co Ltd) 28 Nov. 1989.
Siemens–Bauteile–Informationen, vol. 10, No. 1, 1972, pp. 15–17, Gunter Katholing, 'Mos–Festwertspeicher (MOS-–ROM) GDR 101'.

Primary Examiner—Douglas W. Olms
Assistant Examiner—Min Jung
Attorney, Agent, or Firm—Townsend and Townsend and Crew LLP

[57] ABSTRACT

An interface to an indicator array for providing status information from a repeater used in a computer network. The interface multiplexes status value signals from the repeater provided to a group of enabled source buffers driving columns of the array. Rows of the array are driven by status enable signals from a sink buffer attached to each row. LEDs of the array have an anode connected to a source buffer and a cathode connected to a sink buffer. Cycling through the source buffer groups and status enable signals provides a 10% duty cycle for each indicator. When status values change more frequently than about once per millisecond, a pulse stretcher is used to extend the perceived duration of the status indication.

11 Claims, 5 Drawing Sheets

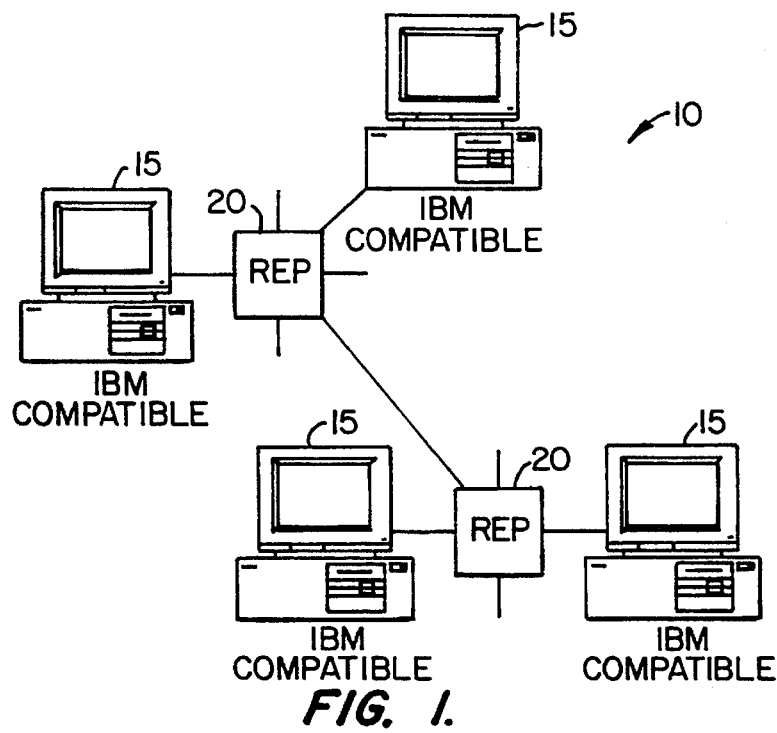
FIG. 1.
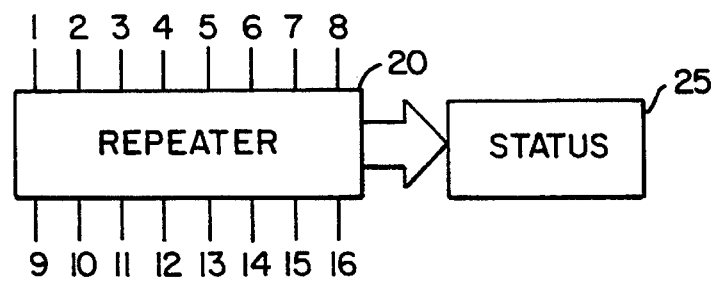
FIG. 2.
|  | PORT 1 | PORT 2 | PORT 3 | PORT m |
|---|---|---|---|---|
| CRS | $30_{1,1}$ | $30_{2,1}$ | $30_{3,1}$ | $30_{m,1}$ |
| COL | $30_{1,2}$ | $30_{2,2}$ | $30_{3,2}$ | $30_{m,2}$ |
| PART | $30_{1,3}$ | $30_{2,3}$ | $30_{3,3}$ ... | $30_{m,3}$ |
| LINK | $30_{1,4}$ | $30_{2,4}$ | $30_{3,4}$ | $30_{m,4}$ |
| POL | $30_{1,5}$ | $30_{2,5}$ | $30_{3,5}$ | $30_{m,}$ |
FIG. 3.

REPEATER STATUS LED ARRAY INTERFACE

BACKGROUND OF THE INVENTION

The present invention relates generally to computer network management, and more specifically, to manually managed computer networks having an array of indicators to convey repeater status information.

Networks of computers are commonly used in today's business environment. One common network system structure uses one or more repeaters. A repeater will correct timing and amplitude errors of data packets transmitted in the network. A repeater typically includes several ports. A data packet received at one port is retransmitted from the other ports of the repeater. For networks employing a CSMA/CD-type of architecture, such as an ETHERNET® network, every data packet passes through each repeater. Therefore, a network administrator may conveniently use each repeater as a management device from which to gather information concerning the operation of the network. This information assists the administrator in network management.

Network management has evolved into two broad classes of methodology. One class provides for automatic management of a repeater, with the other class providing for unmanaged repeaters. A managed repeater has an interface to a management unit, and provides repeater status information to the management unit. The management unit will process the status information, and automatically take corrective action if required.

An unmanaged repeater does not make use of a management unit. Rather, the repeater provides an interface for an array of indicators, such as light emitting diodes (LEDs), that are activated in response to status information from the repeater. The network administrator is required to manually monitor the LEDs for an indication of a condition for the network. If the LEDs indicate a condition requiring corrective action, the network administrator adjusts the network as necessary in response to the indications from the LEDs.

While the managed repeater methodology provides greater control and management functionality, it is a more expensive network solution. The unmanaged repeater is a less expensive solution. An unmanaged network's cost may be reduced by limiting interface components, particularly those that relate to passing status information via the indicator array. For example, a repeater that includes sixteen ports, and that has five status conditions monitored by the indicator, requires eighty indicators. For a repeater integrated into a semiconductor device, an inelegant solution would be to provide one pin for each indicator of the array, plus a ground pin. Such a solution would be too expensive to implement. For example, the configuration described would require 81 extra pins. The interface and external components to selectively activate each of these indicators can contribute significantly to the final cost of an unmanaged repeater.

SUMMARY OF THE INVENTION

The present invention provides apparatus and method for simply, efficiently and economically driving an array indicator with status values. The preferred embodiment activates individual indicators with a low duty cycle. The interface includes a pulse modifier for those status values that change fast enough to be otherwise difficult, or impossible, to observe. An advantage of the preferred embodiment is that a greatly reduced pin count is required for output of the various status conditions.

According to one aspect of the invention, it includes a plurality of groups of a plurality of source buffers coupled to each column of the array indicator. Each column of the array identifies a particular port of a repeater. Each group of source buffers is responsive to a buffer select signal to enable the source buffers in the group to drive a source current. Each group of source buffers receives a plurality of status lines, each line having a plurality of time-division multiplexed status values indicating particular status conditions. One source buffer from each group is coupled to each status line. Individual source buffers are activated in response to assertions of status values. A plurality of sink buffers are attached to each row of the indicator array. Assertion of a status enable signal associated with a specific status indication enables the sink buffer to sink a current from the row it is attached to. An LED is illuminated only when the source buffer coupled to its anode is in an enabled group and the source buffer receives an asserted status value and the sink buffer coupled to its cathode is enabled. For status values that change rapidly, a pulse modifier extends the apparent duration of the status indication to allow the LED indication to be observed.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 1 is a block schematic diagram of a computer network implementing a star topology, having an unmanaged repeater at each hub of the network;

FIG. 2 is a is block diagram of a sixteen port unmanaged repeater connected to an indicator array;

FIG. 3 is a block diagram of the indicator array;

DESCRIPTION OF THE PREFERRED EMBODIMENT

Figure 4:
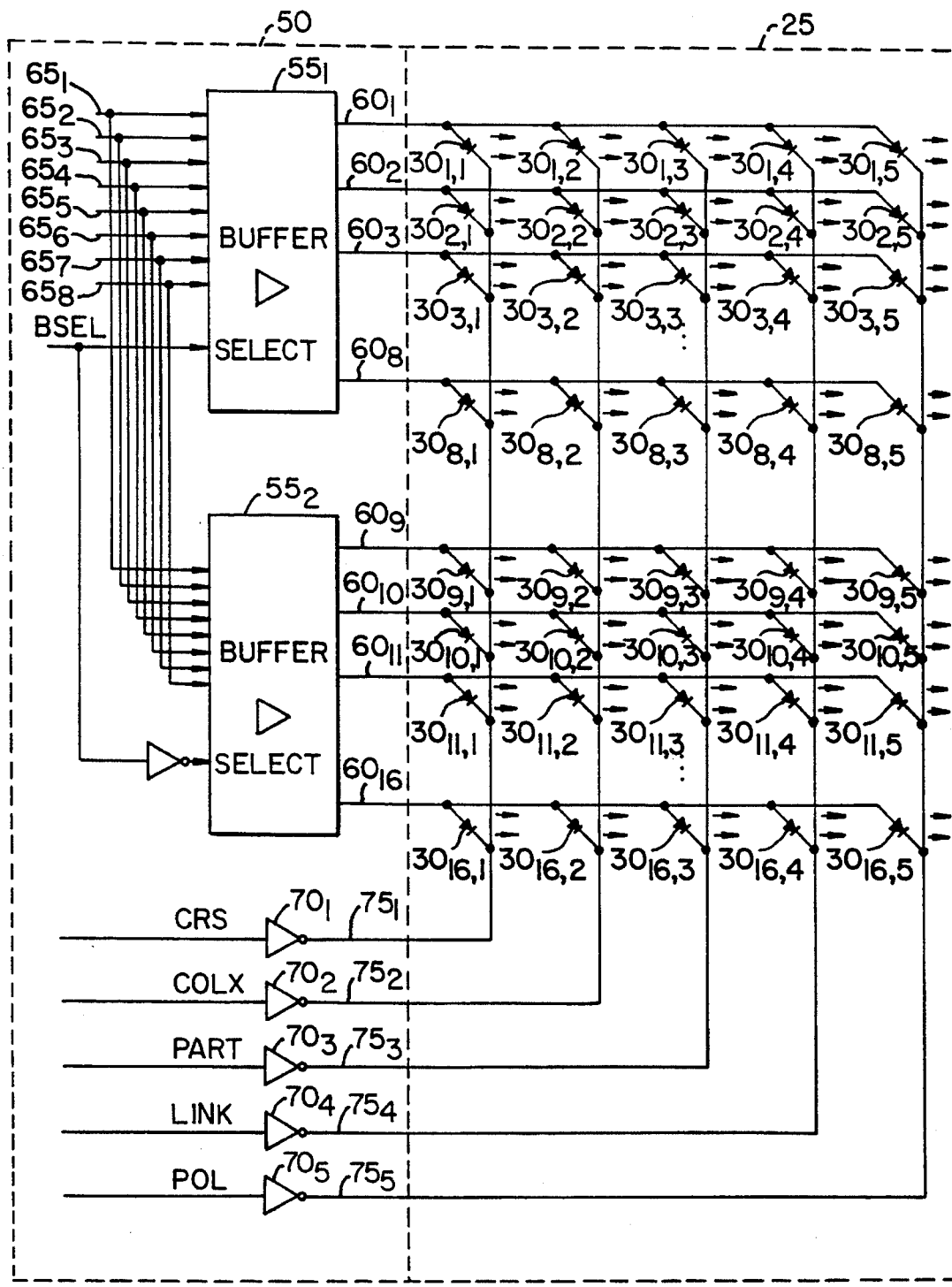
FIG. 4 is a schematic diagram of a driver circuit for the indicator array.

FIG. 1 is a block schematic diagram of a network 10 of a plurality of end stations 15 (e.g., personal computers) implementing a star topology, network 10 includes an unmanaged repeater 20 at each hub. The preferred embodiment is implemented using a carrier sense multiple access with collision detection (CSMA/CD) compliant network.

Repeater 20 conforms to IEEE Standard 802.3, hereby expressly incorporated by reference for all purposes.

In operation, network 10 passes a data packet from one personal computer 15, through one or more repeaters 20, to another personal computer 15. Repeater 20 receives the data packet at one port, and broadcasts the data packet from other ports.

FIG. 2 is a block diagram of repeater 20 connected to an indicator array 25. Repeater 20 is shown with sixteen ports, although the present invention may be implemented with repeaters having a different number of ports. Associated with each of the ports are a number of various status conditions. Repeater 20 provides an indication of these status conditions, per port, by sending status information to indicator array 25. There are many different types of status conditions that may be displayed using the preferred embodiment. Though the preferred embodiment implements the invention using five particular status conditions, other designs and configurations may use other numbers of conditions, or different status types.

FIG. 3 is a block diagram of indicator array 25. Indicator array 25, according to the preferred embodiment, includes an array of indicators $30_{i,j}$, one column for each of m ports (for a total of sixteen columns in the preferred embodiment), and a row for each status. There are a total of eighty indicators ($30_{i,j}$ (i=1 to 16, j=1 to 5)) for indicator array 25.

The preferred embodiment monitors and displays five conditions for each port: carrier sense (CRS), collision (COL), partition (PART), link status (LINK), and polarity (POL). Further discussion of these conditions are included in the incorporated IEEE standard and will not be further discussed herein.

FIG. 4 is a schematic diagram of a driver circuit 50 for indicator array 25. In the preferred embodiment, each indicator $30_{i,j}$ shown in FIG. 3 is a light emitting diode (LED). An LED will illuminate so indicate the status value of a particular status condition for a particular port. Driver circuit 50 includes a first buffer unit $55_1$ and a second buffer unit $55_2$.

Each buffer unit 55 includes a plurality of source buffers (not shown) that provide a source current on an output line $60_i$, where i ranges from 1 to m (with m being the number of ports). The source current is sufficient to activate one LED. The total number of source buffers is equal to the number of columns of indicator array 25, one source buffer coupled to each column. Each buffer unit 55 is responsive to a BUFFER SELECT (BSEL) signal to enable its source buffers to source current. BSEL is active LOW, enabling a buffer unit when deasserted, though other configurations are possible. A status bus $65_p$, p=1 to m/2 in the preferred embodiment, provides status signals to each buffer unit 55. In general, p multiplied by the number of buffer groups equals m, so multiplexing could be done by three buffer groups with p=m/3. In some implementations, status conditions could be multiplexed as well as, or instead of, port status signals.

Each buffer unit 55 is coupled to one-half (in the preferred embodiment) of the LEDs. In the preferred embodiment having an m×n array of indicators in indicator array 25 (m being the number of ports (sixteen) and n being the number of status indications monitored (five)), there are forty (m divided by 2 multiplied by five) indicators coupled to each buffer unit 55. Status bus 65 includes one status line $65_p$ for each source buffer in each buffer unit 55, with eight source buffers per buffer unit 55, for a total of eight status lines in status bus 65, and eight output lines $60_i$.

Driver circuit 50 includes a sink buffer $70_i$ for each row of indicator array 25. Each sink buffer $70_i$ is implemented in the preferred embodiment as an inverter coupled to a lead line $75_i$. Sink buffer $70_i$ is capable of sinking a sink current. Sink buffer $70_i$ is sized to accommodate a sink current at least equal to the number of source buffers in each buffer unit multiplied by the magnitude of the source current provided by one source buffer. In the preferred embodiment, the sink current could be eight times as great as the source current, depending upon various status indications.

Sinking of a sink current by any particular sink buffer $70_i$ is enabled by assertion of a status enable signal. In the preferred embodiment, each sink buffer $70_i$ corresponds to one status row of indicator array 25. Each LED of indicator array 25 includes an anode and a cathode. The anodes of LEDs in a column x, that is indicators $30_{x,j}$, are each coupled to a common lead line $60_x$. The cathodes of LEDs in a row y, that is indicators $30_{i,y}$, are each coupled to a common lead line $75_y$. An LED will illuminate only when the source buffer coupled to its anode is enabled AND the sink buffer coupled to its cathode is enabled. In the preferred embodiment, driver circuit 50, including sink buffers 70, are integrated into repeater 20. These devices may be included in indicator array 25, or provided separately as needed, depending upon design considerations.

Figure 5:
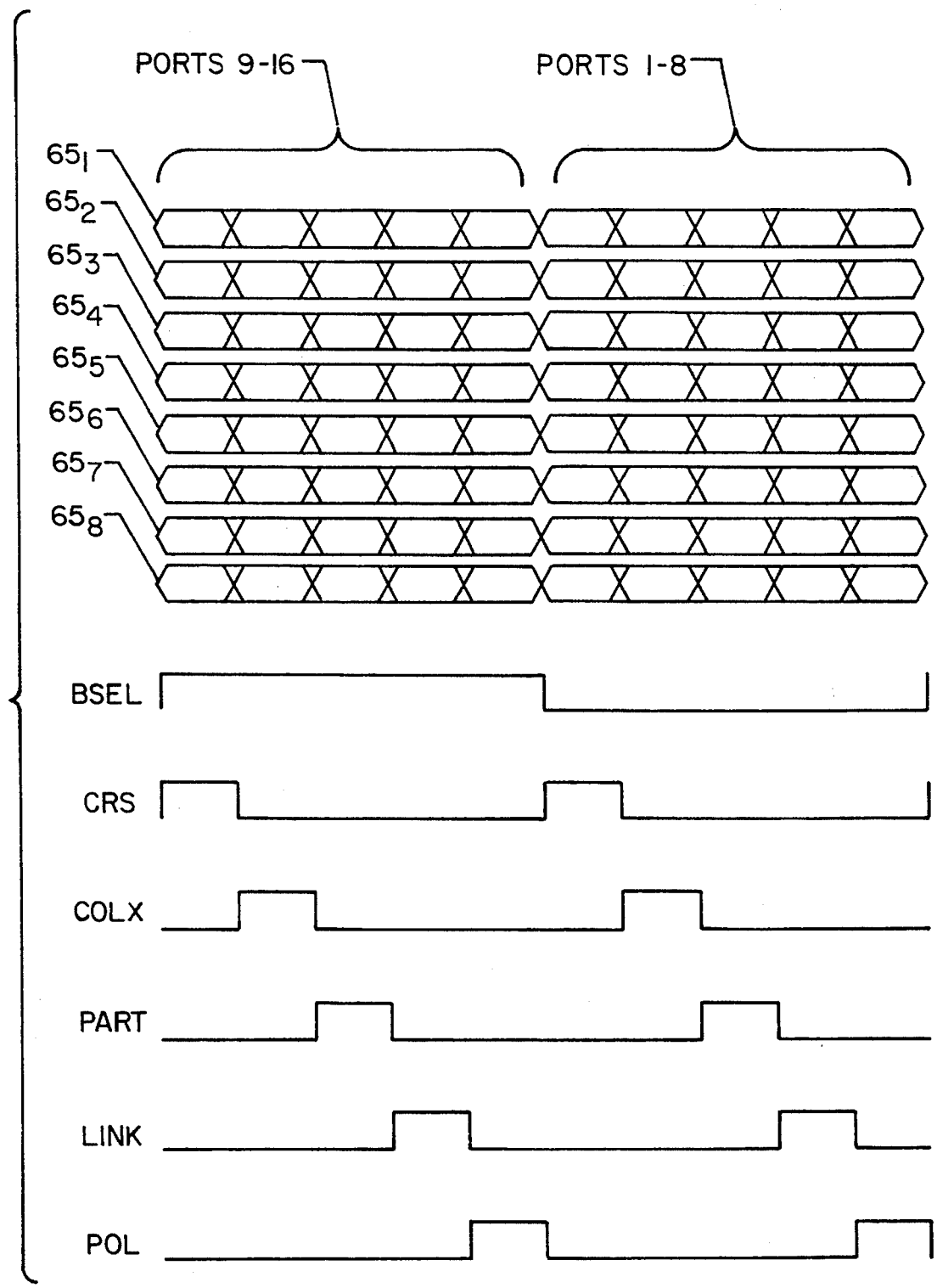
FIG. 5 is a timing diagram for signals on status bus 65, and values for status enable signals CRS, COLX, PART, LINK and POL, and BSEL.

FIG. 5 is a timing diagram for signals on each status bus $65_p$, and values for enable signals BSEL, CRS, COLX, PART, LINK and POL. As shown, status bus 65 includes the eight status lines $65_p$ as indicated above. BSEL alternately enables one buffer unit 55 and then the other buffer unit. As shown, BSEL first enables buffer unit $55_2$. At any one time, status bus 65 carries time-division multiplexed status information for eight of the sixteen ports. Depending upon the value of BSEL, status bus 65 will carry status signals for ports 1–8 (BSEL LOW) and ports 9–16 (BSEL HIGH). Thus, the eight signal streams shown at the top of FIG. 5 first correspond to ports 9–16 (BSEL is HIGH), and correspond to ports 1–8 (BSEL is LOW).

The status values presented on status bus 65 at any particular time is determined by the particular combination of BSEL and the status enable signals CRS, COLX, PART, LINK, and POL. The enable signals and BSEL together periodically cycle through ten different states. While BSEL is HIGH, each of the status enable signals gets asserted. Then, while BSEL is LOW, each of the status enable signals are asserted again. The process repeats itself continuously as long as status information is to be displayed.

In operation, repeater 20 shown in FIG. 2 will determine various status values for ports 1–16. When BSEL is first HIGH, CRS is asserted. Therefore, status bus 65 provides status value signals for the CRS status to buffer unit $55_1$ and to buffer $55_2$. Only buffer unit $55_2$ is enabled by BSEL, so those source buffers in buffer unit $55_2$ receiving an asserted CRS status value will be able to provide a source current on corresponding ones of lead lines $60_9$–$60_{16}$. Buffer unit $55_1$ will not provide source current to any of lead lines $60_1$–$60_8$. This means that only those LEDs corresponding to indicators $30_{9,j}$–$30_{16,j}$ will be enabled.

During the time that the CRS status enable signal is asserted, sink buffer $70_1$ enables a sink current on lead line $75_1$. Thus, only those LEDs corresponding to indicators $30_{i,1}$ will be enabled. The net result is that only LEDs corresponding to indicators $30_{9,1}$–$30_{16,1}$ are enabled. The particular ones of these enabled LEDs that actually illuminate will depend upon the particular status values on status bus 65.

Next, the CRS status enable signal is deasserted and the COLX status enable signal is asserted (with BSEL remaining HIGH). Asserting the COLX status enable signal enables sink buffer $70_2$ to sink current from lead line $75_2$. Thus, LEDs corresponding to indicators $30_{9,2}$–$30_{16,2}$ are enabled. The data on status bus 65 changes to drive COLX status for ports 9–16. This process continues for the PART status enable signal, the LINK status enable signal, and the POL status enable signal.

After cycling through all of the status enable signals with BSEL HIGH, BSEL is LOW. Setting BSEL LOW enables buffer unit $55_1$ and disables buffer unit $55_2$. Thus, LEDs corresponding to indicators $30_{1,1}$–$30_{8,5}$ are enabled, depending upon values presented on status bus 65. The status enable signals are asserted in turn, cycling through CRS, COLX, PART, LINK and POL. The process repeats, continually matching status information signals to the proper buffer unit and status signal class.

As long as the process cycles through the ten states fast enough, a human observer will perceive the periodically illuminated LED as continuously illuminated. The period of BSEL and duration of each status enable signal define a duty cycle for LEDs of indicator array 25. For purposes of a discussion regarding the duty cycle, assume that all the status value signals provided on status bus 65 are asserted. Due to the ten different states, each LED will be driven 10% of the time. In the preferred embodiment, each status enable signal has a pulse width of about 6.4 microseconds. Other values can be used. If the value is too short, the LED may not turn on, and if it is too long, an LED will appear to flicker due to the 10% duty cycle.

As implemented, a single pulse of 6.4 microseconds for the LED is far too short to be perceived by a human observer. To be visible, the LED must be activated in sequence by a series of pulses. This series of pulses is typically in the millisecond range.

For status values that do not change more frequently than about once per millisecond, the invention as described is sufficient to activate indicators $30_{i,j}$ of indicator array 25 to display repeater status information. There are some status conditions in repeater 20 that change more frequently than the visible rate. It is possible that for some of these status conditions, a human observer will not observe a status indication, even though an indicator will actually activate, because the indication is not observable.

The preferred embodiment uses a pulse modifier for these 'stealth' indications having a low observable condition. The present embodiment uses a pulse stretcher as the pulse modifier to ensure that a status indication will be displayed long enough to be observed by an observer. Other types of indicators may require different pulse modification, depending upon the particular reason an observer may not observe it.

The pulse stretcher actually extends a duration of a status value to a sufficiently long duration that it will be visible. The amount of extension determines how responsive an indicator is to changes in the status value. If the extension is too short, the indicator will appear dim. An extension that is too long masks changes in the status value, suggesting to an observer that the status condition is on longer than is actually the case.

Figure 6:
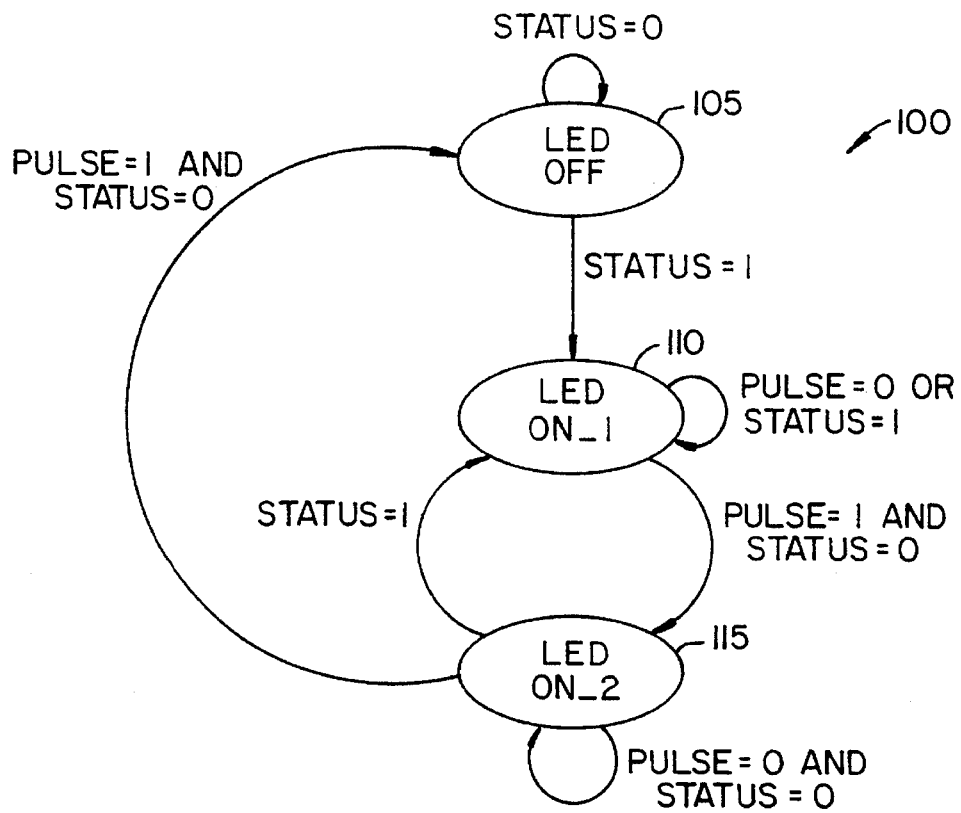
FIG. 6 is a state machine diagram of a pulse stretcher according to the preferred embodiment.

FIG. 6 is a state transition diagram of a state machine 100 for a pulse stretcher according to the present invention. State transition diagram 100 includes three states for an indicator: an OFF state 105, an ON__1 state 110, and an ON__2 state 115. The pulse stretcher responds to a STATUS signal, and to a PULSE signal. The STATUS signal is the status value that is to receive an extension. STATUS is asserted (i.e., HIGH) to indicate that the status is active. The PULSE signal is an output from a freerunning pulse counter that periodically issues the PULSE signal. In the preferred embodiment, the period of the pulse counter is in the milliseconds range. While this value is predetermined in the preferred embodiment, it is possible to provide for a programmable (i.e., changeable) pulse period as well known in the art.

Normally, the pulse stretcher is in OFF state 105. As long as STATUS remains deasserted (i.e., LOW), the pulse stretcher remains in OFF state 105. Assertion of STATUS transitions the pulse stretcher to ON__1 state 110. As long as STATUS remains asserted OR PULSE is deasserted, state machine 100 remains in ON__1 state 110.

When PULSE is asserted AND STATUS is deasserted, state machine 100 transitions to ON__2 state 115. State machine 100 remains in ON__2 state 115 as long as PULSE is deasserted AND STATUS is deasserted. IF STATUS is asserted while the pulse stretcher is in ON__2 state 115, the pulse stretcher transitions back to ON__1 state 110. However, if PULSE is asserted while STATUS is deasserted and the pulse stretcher is in ON__2 state 115, the pulse stretcher transitions to OFF state 105.

Because no relationship exists between assertions and deassertions of STATUS and PULSE, the precise amount of extension provided to a STATUS indication is variable. There is a minimum extension and a maximum extension using the preferred embodiment for the pulse modifier. The minimum is about equal to one period of the pulse counter, and the maximum is about two periods of the pulse counter. For the pulse counter having a period of four milliseconds, the extension ranges from about four milliseconds to about eight milliseconds.

Figure 7:
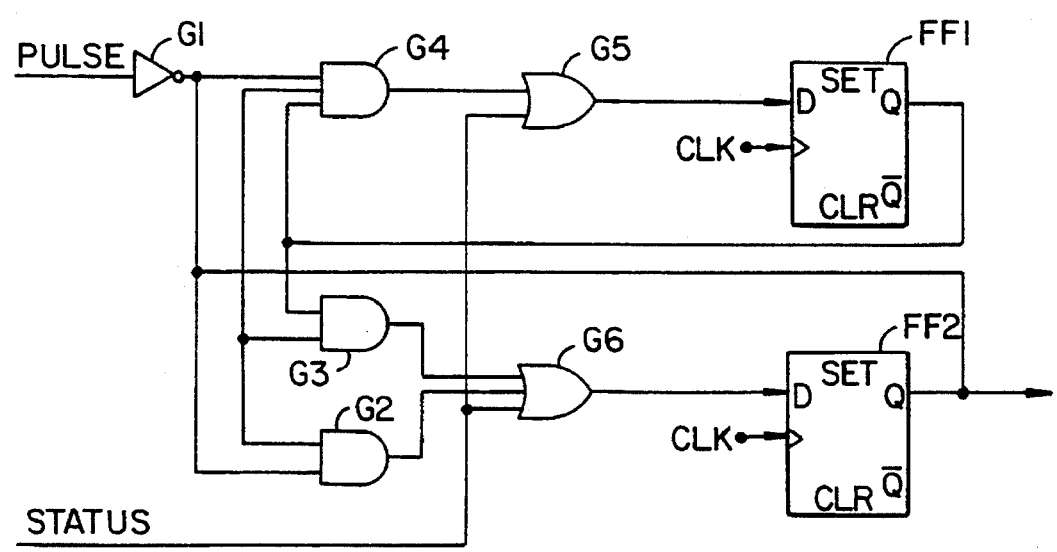
FIG. 7 is a schematic diagram of a pulse stretcher circuit.

FIG. 7 is a schematic diagram of a preferred embodiment of a pulse stretcher 200. Pulse stretcher 200 includes an inverter G1, two dual-input AND gates (G2 and G3), a triple-input AND gate G4, a dual-input OR gate G5, a triple-input OR gate G6, and two D flip-flops (FF1 and FF2). Pulse stretcher 200 implements state machine 100 described above with respect to FIG. 6.

The PULSE signal is coupled to an input of inverter G1. An output of inverter G1 is coupled to one input of AND gate G2 and to one input of AND gate G4. An output of AND gate G2 is coupled to one input of OR gate G6, and an output of AND gate G4 is coupled to one input of OR gate G5.

The STATUS signal is coupled to another input of OR gate G5 and to another input of OR gate G6. An output of OR gate G5 is coupled to a data input of flip-flop FF1. Flip-flop FF1 has an output coupled to another input of AND gate G4 and to an input of AND gate G3. An output of OR gate G6 is coupled to a D-input of FF2, with an output of flip-flop FF2 providing an output OUT. The output of flip-flop FF2 is coupled to another input of AND gate G2, another input of AND gate G3, and another input of AND gate G4. An output of AND gate G3 is coupled to another input of OR gate G6. A 10 MHz clock signal (CLK) is coupled to a clock input of both FF1 and FF2.

Figure 8:
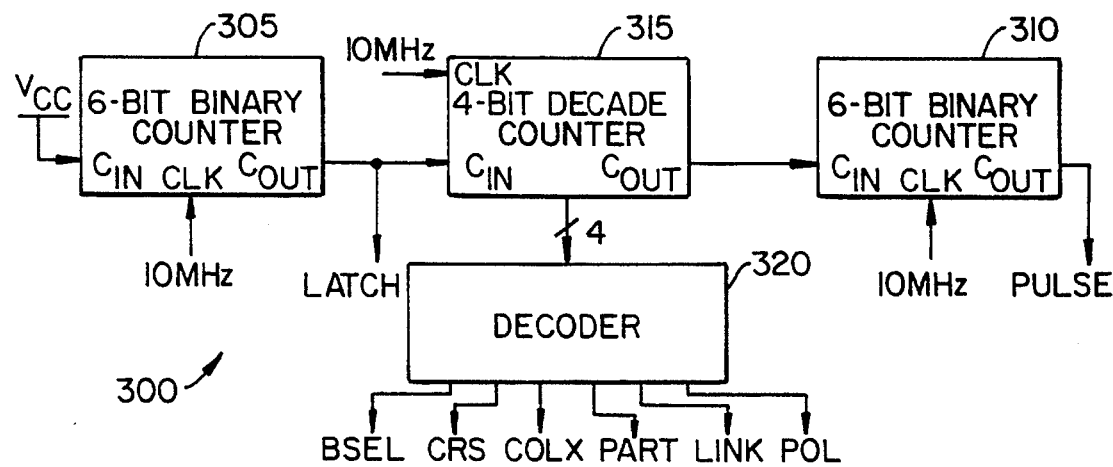
FIG. 8 is a schematic diagram of a preferred embodiment for a first portion of an indicator array interface circuit.

FIG. 8 is a schematic diagram of a preferred embodiment for a first part 300 of an indicator array interface circuit implementing the present invention. First part 300 is integrated into repeater 20. First part 300 includes two 6-bit binary counters (305 and 310) and a 4-bit decade counter 315. A decoder 320 is coupled to an output of counter 315. Each counter includes a carry in ($C_{IN}$) and a carry out ($C_{OUT}$) port. $C_{IN}$ of counter 305 is coupled to $V_{CC}$. A ten megahertz clock is coupled to CLK of counter 305, counter 310 and counter 315. $C_{OUT}$ of counter 305 is coupled to $C_{IN}$ of counter 315. A tap coupled to $C_{OUT}$ of counter 305 provides a LATCH signal output. LATCH pulses about once every 6.4 microseconds. $C_{OUT}$ of counter 315 is coupled to $C_{IN}$ of counter 310. $C_{OUT}$ of counter 310 provides the PULSE signal used in pulse stretcher 200 shown in FIG. 7.

Decoder 320 asserts the status enable signals CRS, COLX, PART, LINK and POL, as well as the BSEL signal. Depending upon a value of the 4-bit decade counter, various ones of the signals are asserted. When counter 315 has a value between 5 and 9, BSEL is HIGH. Table I below shows the status enable signal that is asserted for different values for counter 315. Each of the enable signals is asserted for about 6.4 microseconds, according to the period of CLK.

| COUNTER VALUE | STATUS ENABLE |
| --- | --- |
| 0 | CRS |
| 1 | COLX |
| 2 | PART |
| 3 | LINK |
| 4 | POL |
| 5 | CRS |
| 6 | COLX |
| 7 | PART |
| 8 | LINK |
| 9 | POL |

Figure 9:
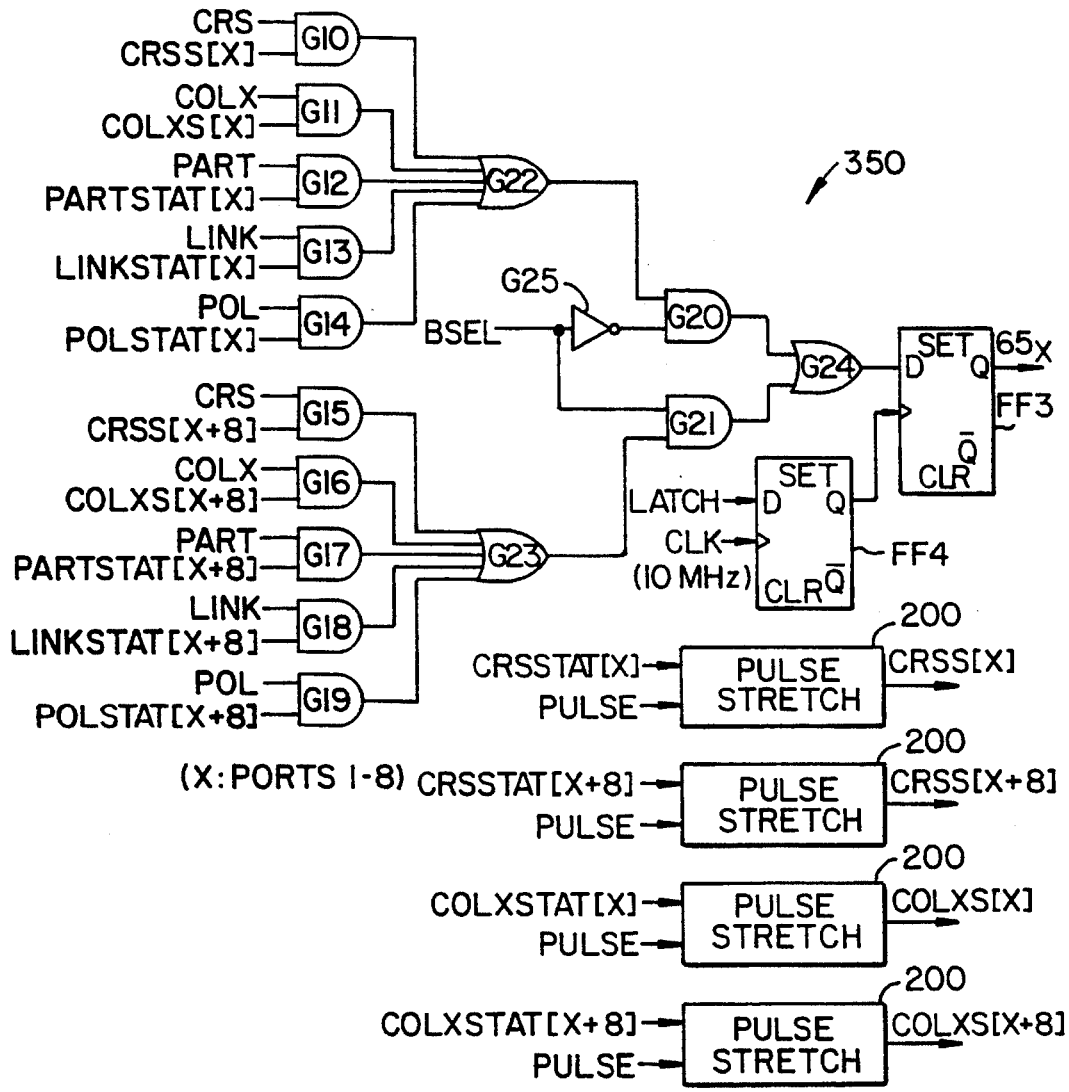
FIG. 9 is a detailed schematic diagram of a second portion of the indicator array interface illustrating one of several multiplexing circuits for driving selected status signals to the indicator array.

FIG. 9 is a detailed schematic diagram of a second part 350 of the indicator array interface circuit. Second part 350 is representative of one of several types of multiplexing circuits that could be used for driving selected status signals to indicator array 25 via status bus 65. In practice, the configuration shown in FIG. 9 is replicated so that there are a total of eight circuits of the type shown, one circuit for each pair of ports as there are two groups of source buffers ($55_1$ and $55_2$). For example, second part 350 shown in FIG. 9 is used for both port 1 and port 9. Others are used for port 2 and port 10, etc. When output, one group of source buffers drives status indications for one of the ports, and the other group of source buffers drives indications for the other port.

Second part 350 includes twelve dual-input AND gates (G10, G11, G12, G13, G14, G15, G16, G17, G18, G19, G20, and G21), two five-input OR gates (G22 and G23), a dual input OR gate G24, an inverter G25 and two flip-flops (FF3 and FF4). AND gates G10–G14 each respectively receive one status enable signal from decoder 320 shown in FIG. 8 at one input. The other input of AND gates G10–G14 each respectively receive a status value from repeater 20 corresponding to the particular status condition for port 1 and associated with the status enable signal on the other input. For example, AND gate G10 receives the CRS status enable signal at one input, and the carrier sense status value from repeater 20 on the other input.

AND gates G15–G19 each respectively receive one status enable signal from decoder 320 shown in FIG. 8 at one input. The other input of AND gates G15–G19 each respectively receive a status value from repeater 20 corresponding to the particular status condition of port 9, and associated with the status enable signal on the other input. For example, AND gate G15 receives the CRS status enable signal at one input, and the carrier sense status value from repeater 20 on the other input.

As noted above, certain ones of the status values from repeater 20 require pulse stretching for optimum performance. In the preferred embodiment, two status conditions, carrier sense status (CRSSTAT) and collision status (COLXSTAT) are stretched using pulse stretcher 200 shown in FIG. 7. Thus, CRSSTAT for port 1 and for port 9, and COLXSTAT for port 1 and for port 9, each require one pulse stretcher 200. CRSSTAT[X], where X designates a particular port number, is stretched and becomes CRSS[X]. Similarly, COLXSTAT[X] becomes COLXS[X]. The outputs of the pulse stretchers are coupled to appropriate ones of AND gates G10–G19 that receive the related states enable signal.

The output of each AND gate G10–G19 provides a logical product of a status condition and the appropriate status enabling signal. Thus, only those status values corresponding to the particular status enabling signal asserted by decoder 320 are passed to the outputs of AND gates G10–G19. At any time, only one status enabling signal is asserted, therefore, only two status values are output from AND gates G10–G19, one from AND gates G10–G14, and another from AND gates G15–G19.

OR gate G22 receives all of the outputs of AND gates G10–G14 and asserts an output signal when the enabled status value for the particular port X (here, X=1) is asserted. Similarly, OR gate G23 receives all of the outputs of AND gates G15–G19 and asserts an output signal when the enabled status value for the particular port X+8 is asserted. The output of OR gate G22 is coupled to an input of AND gate G20. The output of OR gate G23 is coupled to an input of AND gate G21. The other input of AND gate G21 receives the BSEL signal. BSEL is also coupled to an input of inverter G25. The output of inverter G25 is coupled to the other input of AND gate G20. The outputs of AND gate G20 and AND gate G21 are coupled to the inputs of OR gate G24. BSEL operates to select one of the status values output from OR gate G22 and OR gate G23. When BSEL is HIGH, the output of OR gate G23 is passed to one input of OR gate G24. Similarly, when BSEL is LOW, the status value output from OR gate G22 is passed to the other input of OR gate G24. In this fashion, only one of the status values is provided to OR gate G24 at any one time.

An output of OR gate G24 provides data input to a data terminal of flip-flop FF3. The LATCH signal provided from counter 305 in FIG. 8 is input to a data terminal of flip-flop FF4. CLK (a 10 MHz periodic signal) is input to a clock terminal of FF4. An output of FF4 is coupled to a clock input of FF3. Assertions of LATCH are latched into FF4 and clock the status value output from OR gate G24 by use of flip-flop FF3 so the status value is presented at an output of flip-flop FF3. The output of flip-flop FF3 is one status line $65_x$ of status bus 65 shown in the figures described above. The combination of outputs of flip-flop FF3 for each of the eight second portions 350 makes up status bus 65.

In conclusion, the present invention provides a simple, efficient solution to a problem of inexpensively and discretely driving each indicator of an indicator array. While the above is a complete description of the preferred embodiments of the invention, various alternatives, modifications, and equivalents may be used. For example, the preferred embodiment divides the indicators into two groups and multiplexes status values for various status indications. In some implementations, it may be desirable to divide the indicators into a different number of groups, and use a somewhat more complicated buffer selection mechanism. It is possible, for certain designs, to multiplex status enable signals as well as, or instead of, the status indications from the ports. In other designs, the pulse modifier may be implemented differently to shape status signals for a different type of indicator than the preferably used LED. Therefore, the above description should not be taken as limiting the scope of the invention which is defined by the appended claims.

What is claimed is:

1. A method for interfacing a repeater having a first port and a second port to an array of indicators in order to display a first status condition and a second status condition of the ports, the method comprising the steps of:
   a) multiplexing a first, a second, a third and a fourth status condition signal corresponding to the first and second status conditions of the first and second ports of the repeater to produce a multiplexed status signal, said multiplexed status signal including a first, a second, a third and a fourth status period, one status period for each of said status condition signals;
   b) driving a status line of the repeater with said multiplexed status signal;
   c) demultiplexing said multiplexed status signal to independently activate, according to a particular status condition signal asserted on said status line for each of said status periods, a first indicator during only said first status period, a second indicator during only said second status period, a third indicator during only said third status period and a fourth indicator during only said fourth status period.

2. The interfacing method of claim 1 further comprising the step of:
   modifying a particular one of said status condition signals that corresponds to a status condition that changes more frequently than a predetermined period so that each assertion of said particular one status condition signals is greater than said predetermined period.

3. An interface for a repeater status indicator array, comprising:
   a repeater front-end for generating a first plurality of status signals for each of a second plurality of ports of said repeater;
   a status signal multiplexer, coupled to said repeater front-end, for time-division multiplexing said first plurality of status signals to produce a third plurality of multiplexed status signals on a third plurality of status lines wherein said third plurality is less than said second plurality and each of said third plurality of multiplexed status signals includes a synchronized status period for each status condition of at least two different ports; and
   a demultiplexer driver, coupled between an output of said multiplexer and the indicator array, for independently activating, according to particular ones of said status condition signals asserted on said third plurality of status lines for each of said status periods, each indicator of the indicator array during only one of said status periods.

4. The interface of claim 3 further comprising:
   a pulse stretcher, coupled between said repeater front-end and said multiplexer, for modifying a particular one of said status signals that corresponds to a status condition that changes more frequently than a first predetermined period so that each assertion of said particular one status condition signals is greater than a second predetermined period.

5. An indicator interface for driving an array of indicators with status conditions from a repeater, the repeater integrated into a semiconductor device, the interface comprising:
   a first and a second group of source buffers, each group including a plurality of source buffers, each group coupled to each status line of a plurality of status lines and responsive to an enable signal, and each source buffer of said groups having an input coupled to one status line of said plurality of status lines and an output of a particular source buffer coupled to a plurality of indicators in a column of the indicator array to activate said column when said enable signal is asserted to a particular group including said particular source buffer, each particular source buffer coupled to a different one of said columns;
   a plurality of sink buffers, each having an input coupled to a status enable signal line, and an output of a particular sink buffer coupled to a plurality of indicators in a row of the indicator array to activate said row when a particular status enable signal is asserted on a particular status enable signal line coupled to said particular sink buffer; and
   an interface driver, coupled to the repeater, to said plurality of sink buffers, and to said groups of source buffers, for:
      asserting a plurality of time-division multiplexed status condition signals to said groups of source buffers on said plurality of status lines;
      asserting said enable signal to only one of said groups of source buffers; and
      asserting said particular status enable signal to said particular sink buffer.

6. The indicator interface of claim 5 wherein said interface driver is integrated with the repeater.

7. The indicator interface of claim 5 further comprising:
   a pulse stretcher, coupled between the repeater and the indicator array, for modifying a status signal from the repeater that corresponds to a status condition that changes more frequently than a first predetermined period so that each assertion of said particular one status condition signals is greater than a second predetermined period.

8. A method for interfacing to an m×n array of a plurality of indicators having indicators arranged in m columns that correspond to ports of a repeater, m evenly divisible by i, wherein i is at least equal to one, and having indicators arranged in n rows that correspond to a particular status of an n number of statuses, the method comprising the steps of:
   a) activating a group from a plurality of groups of a plurality of source buffers, each column of the array coupled to a different one of said plurality of source buffers;
   b) activating one at a time each of a plurality of sink buffers, each row of the array coupled to a different one of the plurality of sink buffers, wherein each sink buffer enables a specific status indication for the n number of statuses;
   c) asserting, for each activation of a specific one of said plurality of sink buffers, a status signal to every source buffer of an activated group that corresponds to a port of the repeater represented in said activated group that has a condition corresponding to said specific status indication enabled by said specific one sink buffer;
   d) activating a previously unactivated group from said plurality of groups of said plurality of source buffers; and
   e) repeating steps b)–d) as long as a previously unactivated group exists, otherwise considering all groups as previously unactivated and restarting at step a).

9. An interface to an m×n array of a plurality of indicators having indicators arranged in m columns that correspond to ports of a repeater, m evenly divisible by i, wherein i is at least equal to one, and having indicators arranged in n rows that correspond to a particular status of an n number of statuses, comprising:

means for activating each of a group of source buffers from a plurality of groups of a plurality of source buffers, each column of the array coupled to a different one of said plurality of source buffers;

means for independently activating each of a plurality of sink buffers, each row of the array coupled to a different one of the plurality of sink buffers, wherein each sink buffer enables a specific status indication for the n number of statuses;

means for asserting, for each activation of a specific one of said plurality of sink buffers, a status signal to every source buffer of an activated group that corresponds to a port of the repeater represented in said activated group that has a condition corresponding to said specific status indication enabled by said specific one sink buffer; and means, coupled to said means for activating a group of source buffers, for deactivating an activated group and for activating another group from said plurality of groups of said plurality of source buffers until every one of said plurality of groups becomes activated.

10. An interface for an m×n array of a plurality of indicators having indicators arranged in m columns that correspond to ports of a repeater, m evenly divisible by i, wherein i is at least equal to one, and having indicators arranged in n rows that correspond to a particular status of an n number of statuses, the interface comprising:

a first number of status lines, said first number equal to m divided by i;

a second number of source buffers, each of the m columns of the array coupled to a different one of said source buffers, for sourcing a source current sufficient to activate one of the plurality of indicators, each said source buffer responsive to a status signal to enable sourcing of said source current, said second number of source buffers associated into a third number of groups of source buffers wherein all source buffers of a particular group are each responsive to a select signal to enable sourcing of said source current only when said select signal is asserted to said particular group, wherein said third number is equal to i and, for each group of source buffers, one of said source buffers is coupled to a different one of said first number of status lines such that each status line is coupled to a corresponding source buffer in each said group of source buffers such that each group corresponds to a subset of the ports of the repeater;

a fourth number of sink buffers, each of the n rows of the array coupled to a different one of said sinking buffers with each sink buffer associated with one of said plurality of statuses, for sinking a sink current sufficient to activate at least m divided by i indicators, each said sink buffer responsive to a status enable signal to enable sinking of said sink current only when said status enable signal is asserted, said fourth number is equal to n; and a controller, coupled to said first number of status lines, said second number of source buffers and to said fourth number of sink buffers, and responsive to the n number of statuses for each of the m number of ports from the repeater, for successively and periodically asserting and deasserting said status enable signal to each of said fourth number of sink buffers and successively and periodically asserting and deasserting said select signal to each group of said third number of groups of source buffers such that each sink buffer is enabled at least once each time one group of said third number of groups of source buffers is enabled, said controller asserting, on said first number of status lines, a plurality of said status signals for a subset of the ports of the repeater that correspond to those ports of the repeater that are a subset of the ports represented by the enabled group of source buffers and that correspond to a particular status associated with a particular sink buffer receiving an asserted status enable signal, such that an indication from the repeater of an existence of a condition for a specific status for a specific port that requires activation of one of the plurality of indicators results in said controller activating a specific indicator of the array that corresponds to said specific port and said specific status by asserting said status signal corresponding to said condition to a specific source buffer coupled to said specific indicator each time said controller asserts said status enable signal to said sink buffer coupled to said specific indicator and concurrently asserts said enable signal to a particular group of source buffers that includes said specific source buffer.

11. An apparatus for interfacing between a repeater and an indicator array, the apparatus comprising:

means for multiplexing a first plurality of status signals generated by the repeater for each of a second plurality of ports onto a third plurality of status signal lines, wherein said third plurality is less than said second plurality; and means, coupled to said means for multiplexing, for activating indicators of the indicator array for a status period responsive to particular ones of said plurality of status signals asserted on said third plurality of status lines.

* * * * *